(12) United States Patent
Lanouette et al.

(10) Patent No.: US 6,563,085 B2
(45) Date of Patent: *May 13, 2003

(54) WELDING MACHINE WITH AUTOMATIC PARAMETER SETTING

(75) Inventors: Andre Lanouette, Appleton, WI (US); Leon Blank, Appleton, WI (US); Warren Herwig, Oshkosh, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/854,160

(22) Filed: May 11, 2001

(65) Prior Publication Data

US 2001/0040153 A1 Nov. 15, 2001

Related U.S. Application Data

(63) Continuation of application No. 09/408,330, filed on Sep. 29, 1999, now Pat. No. 6,248,975, which is a continuation of application No. 08/857,355, filed on May 16, 1997, now Pat. No. 6,091,048.

(51) Int. Cl.$^7$ .................................................. B23K 9/10
(52) U.S. Cl. ..................................... 219/130.5; 219/74
(58) Field of Search .................. 219/130.5, 130.21, 219/132, 137.7, 137.71, 74, 98; 235/375; 242/588.2

(56) References Cited

U.S. PATENT DOCUMENTS

| | | | |
|---|---|---|---|
| 3,509,314 A | * | 4/1970 | Freytag .................. 219/137.71 |
| 3,581,050 A | | 5/1971 | Brown et al. |
| 3,581,051 A | | 5/1971 | Brown |
| 4,000,374 A | | 12/1976 | DeKeyser |
| 4,415,792 A | | 11/1983 | Jordan |
| 4,527,045 A | | 7/1985 | Nakajima et al. |
| 4,608,482 A | | 8/1986 | Cox et al. |
| 4,767,913 A | | 8/1988 | Weber et al. |
| 5,278,390 A | | 1/1994 | Blankenship |
| 5,500,512 A | | 3/1996 | Goldblatt |
| 5,553,810 A | | 9/1996 | Bobeczko |
| 5,692,700 A | | 12/1997 | Bobeczko |
| 6,091,048 A | * | 7/2000 | Lanouette et al. ..... 219/130.21 |
| 6,248,975 B1 | * | 6/2001 | Lanouette et al. ..... 219/130.21 |

FOREIGN PATENT DOCUMENTS

| | | |
|---|---|---|
| EP | 0 463 489 A3 | 6/1991 |
| JP | 57-177885 | 1/1982 |
| SU | 1426720 | 9/1988 |

OTHER PUBLICATIONS

Abstract/Zusammenfassung/Abrege XS 9830363810 MA.

* cited by examiner

Primary Examiner—Clifford C. Shaw
(74) Attorney, Agent, or Firm—George R. Corrigan

(57) ABSTRACT

A method and apparatus for welding that includes a power source and a wire feeder is disclosed. One or more sensors sense one or more welding conditions before the weld is initiated. A set up circuit is coupled to sensor, the power source, and the wire feeder. The set up circuit automatically sets up the welding machine in response to what the sensor senses. The sensor may be a wire sensor, including a diameter sensor and a material sensor, a gas sensor (if a source of gas is included) such as a cyclic voltametry gas microsensor, a workpiece thickness sensor such as a strain gauge or displacement sensor. Alternatively the sensor includes a bar code reader that reads a code on, for example, the spool of wire, an analog proximity detector, a plurality of proximity detectors, and a displacement sensor.

10 Claims, 2 Drawing Sheets

WELDING MACHINE WITH AUTOMATIC
PARAMETER SETTING

This is a continuation of, and claims the benefit of the filing date of, U.S. patent application Ser. No. 09/408,330, filed Sep. 29, 1999, entitled Welding Machine With Automatic Parameter Setting, now U.S. Pat. No. 6,298,975 which is a continuation of, and claims the benefit of the filing date of, U.S. patent application Ser. No. 08/857,355, filed May 16, 1997, entitled Welding Machine With Automatic Parameter Setting which issued on Jul. 18, 2000 as U.S. Pat. No. 6,091,048.

FIELD OF THE INVENTION

The present invention relates generally to welding machines. More specifically, it relates to a welding machine that senses one or more conditions of a welding job and automatically sets operating parameters.

BACKGROUND OF THE INVENTION

Metal-inert-gas (MIG) welding is one well known type of welding process. There are a number of different types of power supplies used for MIG welding. Examples of MIG power supplies include phase controlled, pulse width modulated and inverter power supplies. MIG welding is performed using a variety of wire diameters, wire material, and gasses. The wire and gas used depends on the plate or workpiece thickness and material. Wire diameter, wire material, gas and plate thickness are referred to herein as welding conditions.

Most MIG welding machines use at least three parameters to control the welding process. These parameters are: wire feed speed and/or current, voltage, and inductance. Some MIG welding machines also have an inductance control that affects the response of the power source or supply. Typically, a MIG welding machine will have switches and/or knobs on the front panel to select some or all of the operating parameters. The process of setting one or more of these parameters is called herein machine set up.

Some prior art welding machines (as used herein welding machine refers to the power source, controller, wire feeder, and may include a gas source and other ancillary equipment used to effectuate a weld) are capable of controlling the welding arc to optimize the weld. However, proper control requires optimal operating parameters (current and/or wire feed speed and voltage) for the particular welding conditions (wire diameter, wire material and gas mixture used, as well as the plate thickness and joint type that is being welded). Prior art welding machines require the operator to calculate setup parameters (i.e., voltage, current and/or wire feed speed) from tables or equations using the above welding conditions inputs as independent variables. Alternatively, the appropriate settings may be chosen based on past experience, or by trial and error.

If the operator provides erroneous data, or doesn't properly calculate the setup parameters, the result may be poor quality welds or inefficient use of the welding machine or consumables (gas and wire). Thus, the weld quality is dependent upon the operator properly determining setup parameters. It is not unusual for the operators to improperly select the setup parameters and have such poor quality welds that a service call is required.

Accordingly, it would be desirable for a welding machine to automatically sense one or more of the conditions which enter into the decision for setting wire feed speed and/or current and voltage. Moreover, it would be desirable to automatically set one or more of feed speed and/or current or voltage, in response to the sensed condition. Such a welding machine should be capable of utilizing the wide variety of power supplies.

SUMMARY OF THE PRESENT INVENTION

According to a first embodiment of the invention a welding machine includes a power source and a wire feeder. At least one sensor senses at least one welding condition. A set up circuit is coupled to the sensor, the power source, and the wire feeder. The set up circuit automatically sets up the welding machine in response to the sensor.

According to one alternative the sensor is a wire sensor. In another alternative the welding machine includes a source of gas and a gas sensor. Another alternative includes a workpiece thickness sensor. The set up circuit further automatically sets up the welding machine in response to the additional sensors.

Yet another embodiment uses a diameter sensor and a material sensor as part of the wire sensor. Other alternative configurations of the sensor include a bar code reader, an analog proximity detector, a plurality of proximity detector, and a displacement sensor.

Other embodiments provides for the gas sensor to include a cyclic voltametry gas microsensor, a bar code reader, or a plurality of gas connections. The thickness detector may include a strain gauge or displacement sensor.

Other principal features and advantages of the invention will become apparent to those skilled in the art upon review of the following drawings, the detailed description and the appended claims.

Figure 1:
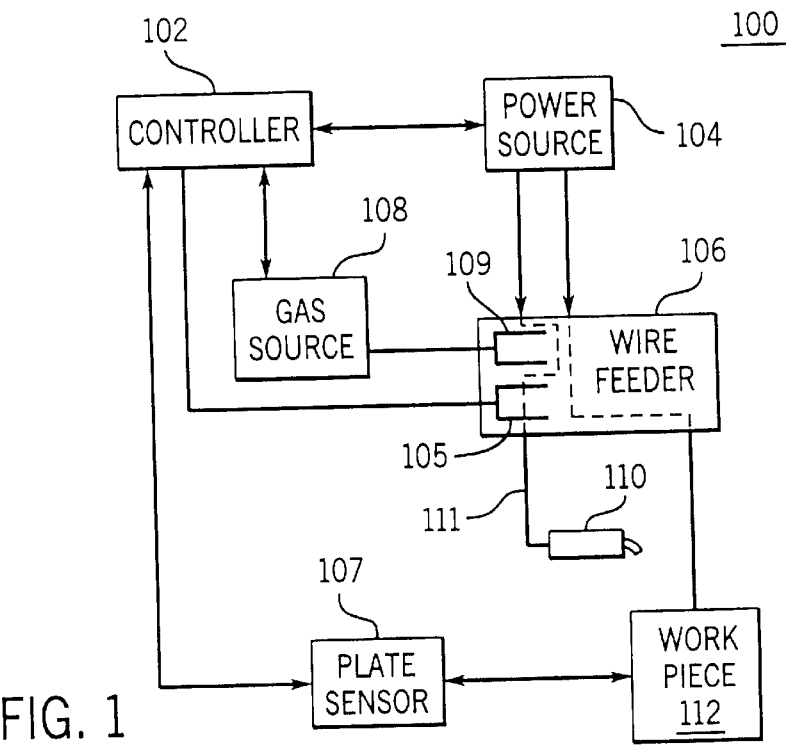
FIG. 1 is a block diagram of a welding machine embodying the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a welding machine having a separate wire feeder and power source, it should be understood at the outset that the inventive welding machine with automatic parameter selection may also be implemented with other types of welding machines, including those that have the wire feeder and power source integrated into a single housing. Also, the invention is not limited to the particular types of sensors discussed below.

Referring now to FIG. 1, an inventive welding machine 100 includes a controller 102, a power source 104, a wire feeder 106 and a gas source 108. Also shown is a welding torch 110 and a workpiece 112. Lines connecting the various boxes in FIG. 1 represent connections such as power connections, feedback connections, control connections and gas connections.

Power source 104 provides weld power to wire feeder 106. Also, gas source 108 provides gas to wire feeder 106. A weld power cable 111 connects wire feeder 106 to torch 110. The weld wire from wire feeder 106 is coaxially fed within weld power cable 111. Weld power cable 111 also includes a conduit to provide gas for torch 110. The other power supply cable provides weld power directly to workpiece 112. This cable completes the power circuit. The components described in this paragraph may be found in the prior art. The invention is not limited to this arrangement: it encompasses other welding machines as well, such as, for example, a welding machine wherein both weld power cables are run through the wire feeder.

Controller 102 provides control signals to power source 104 to control the output current and/or output voltage. Controller 102 also provides a control signal to wire feeder 106 to control the speed at which wire is fed from wire feeder 106 to torch 110. Controller 102 receives feedback signals indicative of the output voltage and current, and the wire feed speed. The feedback for the output current and voltage may be obtained from power source 104 and/or from workpiece 112 in a conventional manner. A set-up circuit contained within controller 102 uses these feedback signals to provide the desired output parameters. The set up circuit may be digital or analog, and either part of or distinct from controller 102.

Controller 102 also receives a signal from wire sensor 105 that indicates the wire diameter and the material comprising the wire. Wire sensor 105 is capable of sensing flux core and solid wires. A plate thickness signal from plate sensor 107 is provided to controller 102. One alternative is omitting plate sensor 107. Other alternatives omit one or both of the wire and gas sensors (discussed below).

A signal indicating the type of gas being provided by gas source 108 is provided by gas sensor 109 to controller 102 and the set up circuit. The particular configuration of the sensors 105, 107 and 109 will be described in detail below. However the invention is not limited to the sensors described herein.

The set up circuit and controller 102 cooperate with sensors 105, 107 and 109 to eliminate the need for the operator to select operating parameters. More specifically, prior to the initiation of the welding process wire sensor 105 detects the wire diameter and the material of the wire. This information is provided to controller 102 and the set up circuit. Also, gas sensor 109 detects the type of gas being provided by gas source 108. This information is provided to controller 102 and the set up circuit. Finally, plate sensor 107 detects the thickness of workpiece (or plate) 112 and likewise provides plate thickness data to controller 102.

These data indicative of the welding conditions are used by controller 102 and the set up circuit to determine the proper operating parameters. The set up circuit may include a microprocessor that has a lookup table from which the proper operating parameters are obtained given a set of welding conditions. Another embodiment provides for the set up circuit to include circuitry (either digital or analog) that implements equations from which the proper operating parameters are calculated. Controller 102 and the set up circuit automatically set up the machine and obviates the need for the user to determine the welding conditions and then select the proper operating parameters. Using the invention thus allows the control panel to have a single on/off switch, without the need for current, voltage or wire feed settings. Thus, the likelihood of operator error has been greatly diminished because the operator does not need to set up the machine.

An alternative embodiment uses the sensors described herein and then prompts the user to set up the machine, after indicating to the user what has been detected. This alternative would beneficially allow the user to compensate for welding conditions such as dirty plate surfaces.

Figure 2:
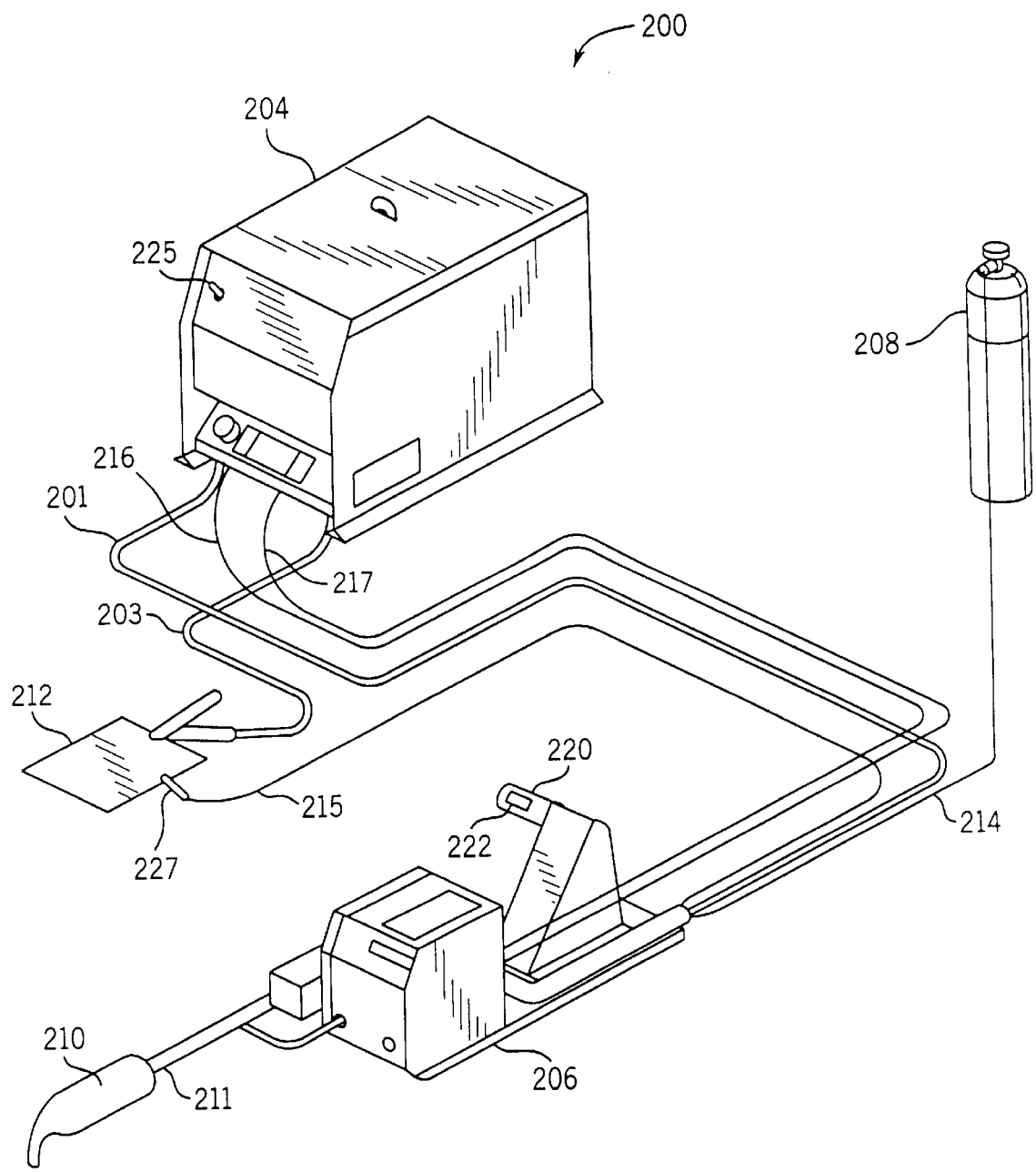
FIG. 2 is a drawing of a welding equipment, including a separate power source and wire feeder embodying the present invention.

Referring now to FIG. 2, a sketch of welding equipment 200 configured in accordance with the preferred embodiment is shown. Welding equipment 200 includes a power source 204, a wire feeder 206 and a gas source 208. A controller (such as controller 102) and the set up circuit are located within wire feeder 206. Weld power is provided by power source 204 to wire feeder 206 on weld power cable 201. Another weld power cable 203 is connected to a plate 212. A coaxial welding cable (conduit) 211 connects wire feeder 206 to a torch 210. Thus, the weld power circuit is completed when an arc is struck between torch 210 and plate 212. A gas cylinder 208 provides gas (such as argon, carbon dioxide, helium, etc) to wire feeder 206 through a gas hose 214. Feedback (the voltage of the plate relative to the weld cable 201) is provided from plate 212 to wire feeder 206 on feedback wire 215. The plate thickness may be determined using wire 215 (as will be described below). A pair of control leads 216 and 217 are used to provide control signals from wire feeder 206 to power source 204. A current feedback signal may be provided from power source 204 to wire feeder 206 on either of wires 216 and 217.

Weld wire feeder 206 includes a hub 220 on which a reel of welding wire is mounted when the welding machine is used. The weld wire is fed from the reel through cable (conduit) 211 to torch 210, where it is used in the welding process. A bar code reader window 222 is shown on hub 220. Bar code reader window 222 is used, in one embodiment, to determine the wire diameter and material. The wire reel includes, on its inside surface, a bar code which uniquely identifies the wire material and the wire diameter.

A cyclic voltametry gas sensor is disposed within (or outside if desired) wire feeder 206. The cyclic voltametry gas sensor is used to determine the gas type.

Welding equipment 200 includes a single on off switch 225 on the front panel of power source 204 (or it may be on wire feed 206). When this switch is turned on, the controller within wire feeder 206 determines the welding conditions (wire material, wire size or diameter, gas type, and plate thickness). Then the operating parameters are determined as previously described, and the machine is automatically set up. One alternative provides that the set up parameters are remembered until the reel is changed (as sensed by a switch), or the set up parameters are determined (and stored) only upon power up or before power up.

One alternative embodiment uses a single knob (in addition to the on/off switch) on the front panel of power source 204 (or wire feeder 206). The knob is used to set plate thickness. The controller uses that information, rather than sensed information via feedback wire 215, to calculate the appropriate operating parameters. Alternatively, the single knob can set or trim the "heat" (actually voltage), which depends on or is a function of plate thickness.

It should be understood that neither the specific arrangements of the welding machines described above, nor the specific sensors that will be described below, limit this invention. Rather, the invention includes using sensors (or otherwise determining) one or more welding conditions so that one or more operating parameters may be automatically determined and set. With that in mind, several sensors will be described below.

Figure 3:
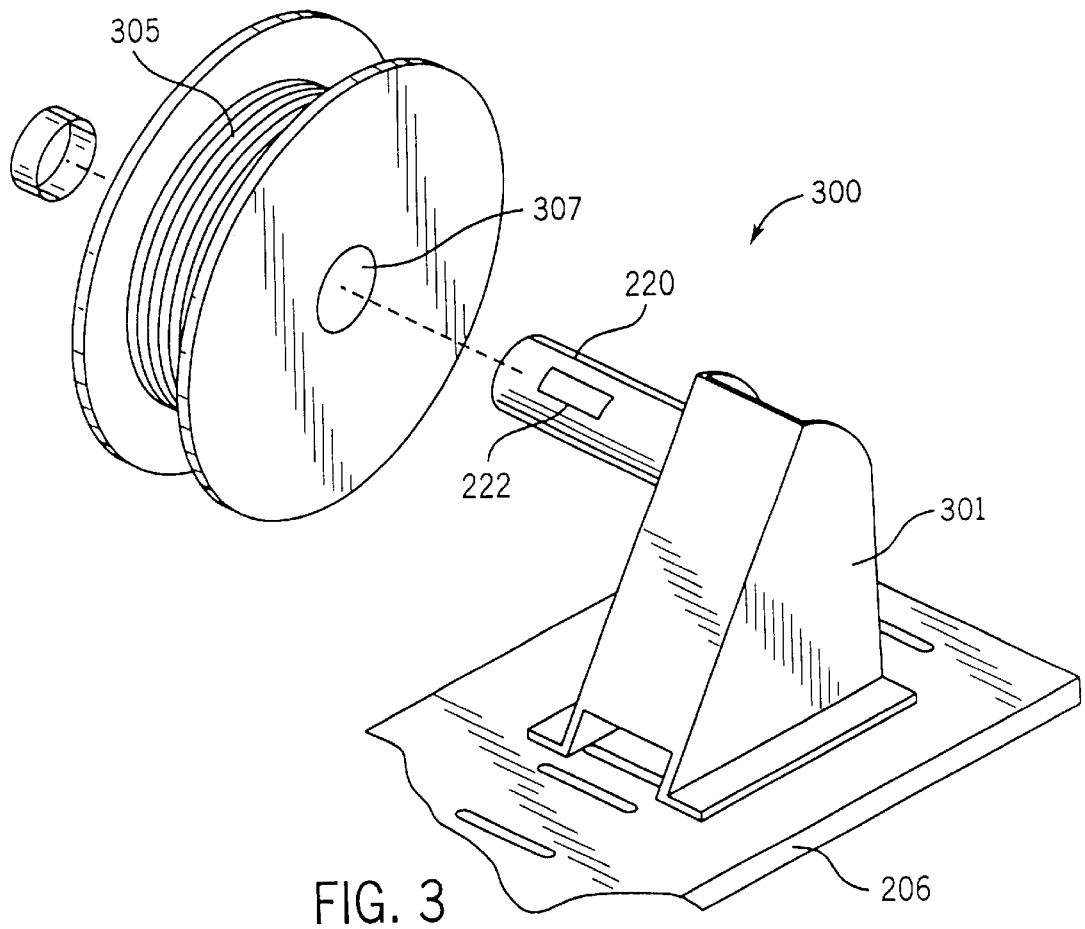
FIG. 3 is a sketch of a spool of welding wire and a de-reeling wire stand.

The preferred embodiment uses a bar code, such as a UPC (Universal Product Code) bar code, on the reel of wire being fed into the machine. A scanner, such as a laser scanner, an LED scanner, or other bar code reader, is used to read the code and help setup the machine. Referring now to FIG. 3, a spool of wire and wire stand demonstrate an embodiment using a bar code reader. A support or stand 301 is mounted on wire feeder 206. Stand 301 supports hub 220. Hub 220 has window 222 thereon, through which a bar code reader scans. A spool of weld wire 305 is placed on hub 220. A bar code is placed on an inner surface 307 of reel 305. When the spool of wire 305 is placed on the hub 220 (which spins with the reel) the bar code is aligned with window 222 so that the controller can determine the type of wire and the diameter of the wire.

Alternatively, the controller can determine the wire type and diameter as the reel is rotated to feed the wire to the arc during set-up when the wire is jogged through the conduit 211. Another alternative is to provide the bar code on the side of wire spool 305 and the bar code reader on support 301. Again, a slot should be provided in reel 306 through which the bar code can be read. Another embodiment includes a bar code wand connected to the controller. Then the wand is used to read the bar code. This alternative is particularly useful when pay-out-packs (where the wire is pulled from the center of the coil) are used. Another alternative is provide a series or set of indentations, bumps, or other mechanical markings or irregularities on the wire reel or drive rolls which could be read by mechanical fingers, switches, or optical switches. Generally, these sensors "read" an indicator of the wire material and diameter that is provided on the wire. Another embodiment uses a tab or card provided with the wire roll, that may be inserted into a reader. It should be recognized there are many variations to this type of sensor.

If other types of wire sensors are used, a separate wire material sensor and a wire diameter sensor may be provided. One commercially available material sensor is an analog proximity detector (one such detector is presently available from Gordon Industries). Alternatively, an analog proximity detector may be constructed using an analog oscillator. A reference coil can be switched into the oscillator circuit to determine the free-running frequency of the oscillator (i.e.: frequency with no wire present). This can be used to eliminate external environmental effects (temperature, humidity, extraneous magnetic materials, etc.) on circuit operation.

One design uses a coil, wherein the welding wire forms the core of a solenoidal inductor. Care should be taken to avoid chafing the welding wire and the coil. Other geometries, such as an "C" core with the wire passing in front of the legs of the "C" to complete the magnetic circuit, may avoid the chafing problem.

Another embodiment for detecting wire material uses multiple proximity switches. Each proximity switch is tuned to detect a specific material. Therefore, three switches (tuned for mild steel, aluminum, and stainless steel) could detect the three material types of interest. Additional switches could be provided for other material (or flux core wire).

Another wire material sensor includes a Hall Effect sensor placed on the opposite side of the wire being sensed from an oscillating magnetic field source. The wire interferes with the magnetic field as it does in the analog oscillator. The Hall Effect sensor measures the magnetic field, and material type is determined based upon the measured field. Also, a reference Hall Effect sensor may be used to provide the same environmental immunity as described above for analog proximity sensor.

A circuit (electric or magnetic e.g.) whose operation is affected by the presence of welding wires of different compositions such that key parameters of circuit operation (voltage, current, frequency, charge, etc.) vary in a manner which allows the different wire compositions to be determined could also be used to determine wire material. Alternatively, a source of radiation (magnetic, electric, or heat) and a sensor could be used to determine how the welding wire affects the radiation field and thereby determine wire material and/or diameter.

One alternative embodiment of the wire diameter sensor is to use a displacement sensor which interrupts a light beam in an amount dependent on the wire diameter. A light beam and sensor are provided near a wire inlet guide. A cam follower is also provided near the wire inlet guide. The cam follower displaces a nonreflective probe into the path of the light beam, thereby reducing the light flux of the beam. The reduction in light flux is proportional to the diameter of the wire. Suitable light detectors include photocells, photo-resistors, photo-transistors, light-intensity-to-voltage converters, light-intensity-to-current converters, light-intensity-to-frequency converters, or other light sensitive electronic devices.

Alternatively, the wire itself may be used to interrupt the light beam. However, care should be taken to avoid the accumulation of dirt and moisture on the light emitter and sensor. Other sensors for measuring the movement of the cam follower include a strain gauge attached to the cam follower, a linear potentiometer, or a piezoelectric sensor. Each of these sensors use the wire to mechanically displace something and measure the displacement.

Another device for measuring wire diameter uses a variable frequency analog oscillator to sense the wire at various frequencies. The skin depth of the signal equals the diameter of the wire at some frequency. When this frequency is reached, the effect of the wire on the oscillator does not change with further changes in frequency. This frequency is determined by scanning or varying frequencies, and from this frequency the diameter of the wire is determined.

Another diameter sensor is a capacitive sensor, which is available commercially (from Gordon Industries e.g.). Generally, any diameter sensor will suffice to implement the present invention, although the type described above may be practical given current technology.

One preferred embodiment of the gas sensor includes different gas connections on the wire feeder for different welding gases. The connectors would be a different size or shape so that they could not be interchanged. The gas hoses then have mating connectors. For example, argon, $CO_2$, and mixed gas hoses would each have a unique connector which would connect to similar mating connectors on power source 206 or wire feeder 204. A pressure sensor (such as a transducer) or flow detector in each gas line internal to the welding machine determines which gas is being used for welding. This embodiment may be used to detect the lack of any gas being used. A variation of this embodiment uses lockout gas valves to prevent gas flow in the lines not being used. When a gas line is connected the pressure on the line being used forces a valve closed on the other lines. A limit switch is then used to detect which valves are closed and therefore determine the gas being used.

Another preferred embodiment relies on a cyclic voltametry gas microsensor. Such a sensor is described in *An Intelligent Gas Microsensor with Neural Network Technology*, SENSORS, October 1996. This sensor uses cyclic voltametry and a computational neural network to determine gas type. A cyclic voltage is applied to an electrolyte material sandwiched between two electrodes. The gas to be determined interacts with the surface of the electrolyte and the current passing through the device is altered at characteristic voltages for each gas. A plot of current versus voltage indicates the gas type.

One other gas sensor used to implement the invention relies on differences in intrinsic gas properties of argon, $CO_2$, $O_2$, and helium. The intrinsic properties include heat capacity or specific heat at constant pressure, $c_p$, heat capacity at constant volume, $c_v$, the ratio of heat capacities, $c_p/c_v$, thermal conductivity, k and density, $\rho$. The properties are measured using an insulated plastic housing that contains a heater (a 2 WATT resistor) and a negative temperature coefficient resistor (NTCR or thermistor). The gas being used fills the box (through a closable vent) and power is applied to the resistor. The temperature of the gas is measured with the NTCR as the gas warms up. Each gas warms up at a unique rate dependent on the heat capacity, thermal conductivity, and density of the gas. The value for $k/c_v\rho$, in ($m^3$ K/KJ), is 0.3032 for helium, 0.0345 for argon, 0.0301 for oxygen, 0.0298 for air and 0.0130 for carbon dioxide. $k/c_v\rho$ is measured for the gas being used, and compared to the known values, and a determination is made as to which gas is present.

Another gas sensor that may be used measures the thermal conductivity of a gas. It consists of a thin insulated tube with a heater (resistor) disposed one end, a heat sink at the other, and two NTCR's placed some distance apart in between. The gas is admitted into the tube and the heater activated. The heat causes a temperature gradient in the gas that is measured. Gasses with a higher heat conductivity will have less of a temperature gradient. Thus, by comparing the measured gradient to known gradients, the gas that is present may be determined. The tube should be insulated to prevent heat loss, and the known gradients may be determined empirically by measuring the gradient for various types of welding gas.

Other sensors can use LEDs tuned to frequencies which are absorbed in different amounts by the gases typically used for welding. For example, $CO_2$ is opaque at infrared wavelengths. Thus, the frequencies (or wavelengths) used are selected so that each gas may be identified. Then the type of gas may be determined from the relative absorption spectra. Commercially available sensors which determine the type of gas include depleting or non-depleting sensors. Another commercially available sensor is an automotive oxygen sensor (used for pollution control systems).

The gas sensors used herein could be active during a "pre-flow" or purge period wherein gas is flowing before the welding process is initiated.

Also, a bar code reader could be used to determine the gas type. The scanner could be mounted on the cart that holds the gas cylinder, or a wand may be provided. When the wire sensor is also a bar code reader, a single wand can be provided. Each bar code may then be read, and the controller can determine which welding condition is being sensed, as well as what the condition is. Alternatively, a mechanical sensor like those described with reference to the wire sensor, such as those using bumps or a card or tab, may be used.

The preferred embodiment of the plate thickness detector is placing the ground clamp 227 with a strain gauge or potentiometer on the workpiece to determine how wide the clamp is opened, and thereby measure thickness. Thus, by merely clamping the ground clamp so that each side of the plate is touched, the thickness may be measured. At some thickness the maximum output of the machine is reached. Further increases in thickness cannot be compensated for by changing the setup parameters. Accordingly, the size of the clamp should be sufficient to measure this thickness. When the maximum is reached, the user may be warned via a display, light or alarm. Another embodiment uses a variable frequency analog oscillator. The thickness of the workpiece is determined from the frequency where skin depth equals a predetermined fraction of the workpiece thickness. Skin depth is determined over a range of (or several discrete) frequencies. Then the frequency and corresponding skin depth is compared by the controller to previously empirically determined values.

It should be clear from the description of the preferred embodiment that a wide variety of sensors may be used to implement the inventive welding machine that has automatic set-up.

Numerous modifications may be made to the present invention which still fall within the intended scope hereof. Thus, it should be apparent that there has been provided in accordance with the present invention a welding machine with automatic condition sensing and parameter selection that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, combinations, modifications and variations that fall within the spirit and broad scope of the appended claims.

The embodiments of the invention in which an exclusive property or privilege is claimed are defined as follows:

1. A welding machine for welding a workpiece having a plate thickness, comprising:
   power means for providing welding power to a weld;
   feeding means for feeding wire to the weld;
   sensing means for sensing at least one of a gas and plate thickness; and
   set up means for automatically setting up the welding machine in response to the sensing means, coupled to the sensing means, the power means, and the feeding means.

2. The welding machine of claim 1 further comprising gas means for providing gas to the weld, and wherein the sensing means includes a gas sensing means coupled to the gas means.

3. The welding machine of claim 2 further including a means for sensing workpiece thickness, coupled to the set up circuit.

4. A welding machine comprising:
   power means for providing welding power to a weld;
   feeding means for feeding wire to the weld, coupled to receive welding power from the power means;
   wire sensing means for sensing a wire diameter sensor and to provide a diameter signal indicative of the wire diameter;
   wire material sensing means for sensing the material comprising the wire and to provide a material signal indicative of the wire material;

gas sensing means for sensing a type of gas provided to the weld and to provide a gas signal indicative of the type of gas; and set up means for setting up the machine in response to the wire sensing means, wire material sensing means, and gas sensing means, wherein the set up means is connected to the wire sensing means, wire material sensing means, gas sensing means, power means and feeding means.

5. A welding machine comprising:

power mean for providing welding power to a weld;

feeder means for receiving welding power from the welding power source and feeding wire and weld power to a welding cable;

workpiece sensing means for sensing the thickness of the workpiece and to provide a thickness signal indicative of the thickness of the workpiece; and set up means for receiving a thickness input and wherein the wire feed speed, current, and voltage outputs are further responsive to the thickness input, and wherein the thickness input is coupled thickness sensor, and the set up means is coupled to the feeder means and the power means.

6. A method of welding a workpiece having a plate thickness, comprising:

providing welding power to the weld;

feeding wire to the weld;

sensing at least one of a gas and plate thickness; and automatically setting up the welding machine in response to the sensing.

7. The method of claim 6 further providing gas to the weld.

8. The welding machine of claim 7 further including sensing workpiece thickness.

9. A method of welding comprising:

providing welding power to a weld;

feeding wire to the weld;

sensing a wire diameter sensor and providing a diameter signal indicative of the wire diameter;

sensing the material comprising the wire and providing a material signal indicative of the wire material;

sensing a type of gas provided to the weld and providing a gas signal indicative of the type of gas; and automatically setting up the machine in response to the wire diameter sensing, wire material sensing, and gas sensing.

10. A method of welding comprising:

providing welding power to a weld;

receiving welding power from the welding power source and feeding wire and weld power to a welding cable;

sensing the thickness of the workpiece and to provide a thickness signal indicative of the thickness of the workpiece; and setting a wire feed speed, a current, and a voltage output in response to the thickness.

* * * * *